UNITED STATES PATENT OFFICE.

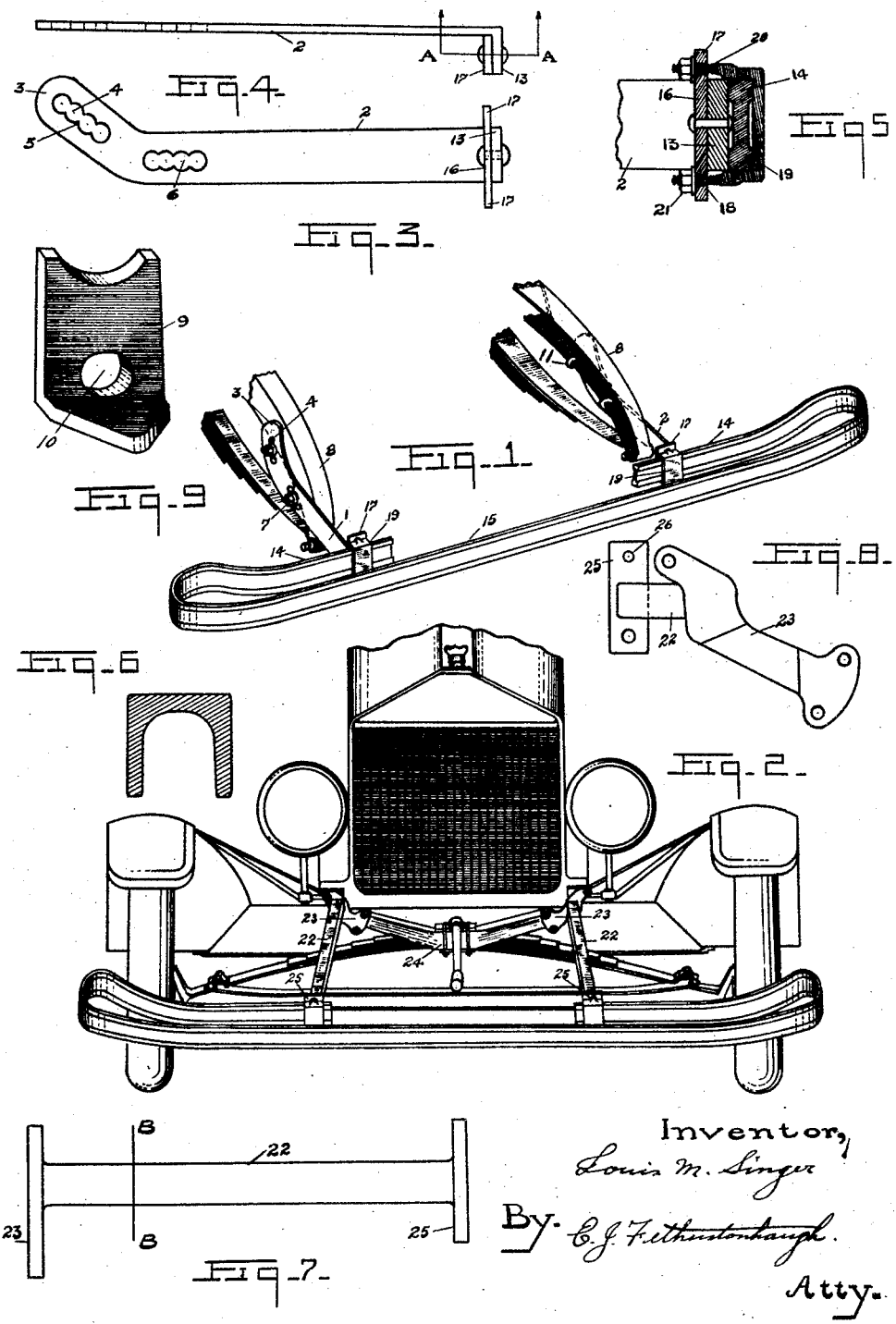

LOUIS M. SINGER, OF TORONTO, ONTARIO, CANADA.

VEHICLE BUMPER.

1,419,417. Specification of Letters Patent. Patented June 13, 1922.

Application filed February 7, 1921. Serial No. 443,097.

*To all whom it may concern:*

Be it known that I, LOUIS M. SINGER, a subject of the King of Great Britain, and resident of 154 Simcoe St., in the city of Toronto, in the county of York, in the Province of Ontario, in the Dominion of Canada, have invented certain new and useful Improvements in Vehicle Bumpers, of which the following is a specification.

The invention relates to improvements in vehicle bumpers as described in the present specification and shown in the accompanying drawings that form a part of the same.

The invention consists essentially of the novel means employed for detachably securing a bumper bar to a vehicle.

One object of the invention is to provide a form of supporting means in the use of which it will not be necessary to weaken or otherwise injure the bumper bar by slotting or cutting holes therein.

Another object is to provide a bracket whereby it will be possible to affix to cars of various widths bumper bars of standard dimensions.

A still further object is to provide a bumper having the maximum of resiliency and strength, and generally the objects of the invention are to produce a vehicle bumper which will be inexpensive to construct, simple of adjustment, efficient and durable.

In the drawings Figure 1 is a perspective view showing a bumper supported from the chassis of a vehicle by means of the brackets which constitute the present invention, portions only of said chassis being shown in the drawings.

Figure 2 is a perspective view from above of the front portion of a Ford motor car showing the means utilized to support the bumper.

Figure 3 is a side elevation of the bumper bracket shown in Figure 1.

Figure 4 is a plan view of Figure 3.

Figure 5 is a cross sectional view through a bumper bracket and bumper, the section through the bracket being taken substantially on the line A—A of Figure 4.

Figure 6 is a cross sectional view taken on the line B—B of Figure 7.

Figure 7 is a plan view of one of the brackets shown in Figure 2.

Figure 8 is an end view of Figure 7.

Figure 9 is a perspective view of one of the washers adapted for insertion between the bracket and the chassis.

Like numerals of reference indicate corresponding parts in the various figures.

Referring to the drawings 1 and 2 are metal bars or straps constituting the supporting brackets proper, said bars or straps at the ends adapted for securing to the vehicle chassis being bent edgewise slightly forming angular ends 3, each of which is provided with a plurality of transverse bolt holes therethrough cut in overlapping arrangement forming an elongated slot 4 having opposing inward projections 5 constituting rigid bolt grips.

The supports 1 and 2 are each provided with a slot 6 constructed similarly to the slots 4 in the ends 3, said slots 6 extending inwardly from substantially the points at which said supports are bent to form the angular ends 3, said slots 4 and 6 being for the reception of hook bolts 7 adapted for securing said supports to the projections 8 of the vehicle chassis and permitting of the adjustment of said bolts in longitudinal relation to said supports.

9 are metal straps bent intermediate of the length thereof to form right angular washers, one arm of each of which is provided with an opening 10 therethrough for the reception of a bolt 7, said washers being adapted for insertion between the members 1 and 2 and the chassis.

The members 1 and 2 are turned at right angles adjacent to the outer ends thereof to form comparatively small vertical brackets 13 presenting flat outer surfaces for engagement by the rear portions 14 of the bumper bar 15, each of said brackets 13 being provided with a vertically arranged plate 16 projecting beyond said bracket at opposite sides forming lugs 17, each having one or more bolt openings 18 therethrough.

It will of course be understood that the plates 16 may be constructed independently and secured to the brackets 13 as shown in the drawings or they may be cast integral with the members 1 and 2.

19 are clamps preferably of sufficient length to extend around the bumper bar and snugly engage the top and bottom edges of said bar and also of the respective brackets 13 and being provided with threaded bolts 20 adapted to extend through the openings 18 in the lugs 17 and to be held in position by means of nuts 21 said clamps and said brackets 13 preferably being substantially equal in width so as to prevent vertical distortion of the bumper bar in relation to said brackets.

In Figures 2, 6, 7 and 8 a modified form of support is shown particularly adapted for use on cars having transversely arranged members presenting flat faces to which the brackets must be secured, said supports or brackets being identical in principle with that of the support described above with the details of construction modified slightly owing to the different construction of the vehicle chassis.

22 are the brackets, each consisting of a metal bar preferably of channel form in cross section and at one end being provided with an integral cross head 23 of irregular form, having suitable openings adapted to receive bolts or other fasteners for securing the bracket to the vehicle frame 24.

The brackets 22 are each formed at their outer ends with an integral cross head 25 having bolt holes 26 therethrough in spaced vertical alignment for the reception of the bolts 20 of the clamps 19.

In the use of this invention the members 1 and 2 are placed with their sides in engagement with the outer sides of the portions 8 of the chassis and the bolts 7 are then projected through the slots 4 and 6 and positioned between the desired projections 5 with their hook ends 11 extending around the plain sides of the washers 9 and on to the inner faces 12 of the chassis. The bumper bar 15 is then placed against the brackets 13 and the clamps 19 placed there over with the bolts 20 projecting through the openings 18 in the lugs 17 and the nuts 20 are then screwed tightly over said bolts, clamping the bumper bar firmly into position.

If desirable the members 1 and 2 may be secured with their ends 3 projecting downwardly, in which case it is simply necessary to place the bolts 7 in position over the upper walls of the channel frame of the vehicle in place of over the lower wall as shown in the drawings.

It will have been apparent from the foregoing that the present invention provides a form of vehicle bumper which is of most simple construction, can be readily adjusted to any make or size of vehicle, and in which the brackets are adjustable, reversible and interchangeable.

What I claim is:—

A vehicle bumper comprising brackets adapted for securing to the vehicle frame and projecting forwardly, said brackets respectively comprising straps set on edge and having end portions turned inwardly at right angles forming vertical walls adapted for engagement by a bumper bar, plates transversely arranged in relation to said turned portions respectively and projecting past the side edges thereof in pierced extensions, and clamps extending through the openings in said plates and securing said bumper bar to said turned portions of said brackets.

Signed at the city of Toronto, this 27th day of January, 1921.

LOUIS M. SINGER.

Witnesses:
G. MURPHY,
W. G. HAMMOND.